United States Patent
Cogswell, Sr.

[11] Patent Number: 5,890,739
[45] Date of Patent: Apr. 6, 1999

[54] VERTICALLY ADJUSTABLE VEHICLE MOUNTED VICE

[76] Inventor: Richard A. Cogswell, Sr., 29 East St., South Salem, N.Y. 10590

[21] Appl. No.: 897,890

[22] Filed: Jul. 21, 1997

[51] Int. Cl.[6] ........................................ B60R 11/06
[52] U.S. Cl. .............................. 280/769; 224/519
[58] Field of Search ................ 280/415.1, 769; 224/402, 519, 521, 42.38; 248/287.1, 295.11, 298.1

[56] References Cited

U.S. PATENT DOCUMENTS

| | | | |
|---|---|---|---|
| 4,705,254 | 11/1987 | Swanson | 248/287 |
| 4,932,620 | 6/1990 | Foy | 248/124 |
| 5,082,037 | 1/1992 | Hammons et al. | 248/286 |
| 5,105,862 | 4/1992 | Skinner et al. | 144/287 |
| 5,267,748 | 12/1993 | Curran | 280/415.1 |
| 5,433,356 | 7/1995 | Russell | 224/519 |
| 5,458,389 | 10/1995 | Young | 224/521 |
| 5,649,656 | 7/1997 | Davy | 224/521 |
| 5,649,732 | 7/1997 | Jordan et al. | 296/26 |

*Primary Examiner*—Paul N. Dickson

[57] ABSTRACT

A vice mounted on a vehicle is provided including a vehicle with an adjustable vertical mounting mechanism coupled to a rear extent thereof. Further provided is a vice coupled to the adjustable vertical mounting mechanism.

2 Claims, 2 Drawing Sheets

1

VERTICALLY ADJUSTABLE VEHICLE MOUNTED VICE

BACKGROUND OF THE INVENTION

1. Field of the Invention

The present invention relates to vehicle mounted vices and more particularly pertains to a new VERTICALLY ADJUSTABLE VEHICLE MOUNTED VICE for allowing vertical movement of a vice coupled to a vehicle.

2. Description of the Prior Art

The use of vehicle mounted vices is known in the prior art. More specifically, vehicle mounted vices heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle mounted vices include U.S. Pat. No. 5,433,356; U.S. Pat. No. 5,267,748; U.S. Pat. Des. No. 282,143; U.S. Pat. No. 5,338,016; U.S. Pat. No. 5,397,147; and U.S. Pat. No. 5,451,088.

In these respects, the VERTICALLY ADJUSTABLE VEHICLE MOUNTED VICE according to the present invention substantially departs from the conventional concepts and designs of the prior art, and in so doing provides an apparatus primarily developed for the purpose of allowing vertical movement of a vice coupled to a vehicle.

SUMMARY OF THE INVENTION

In view of the foregoing disadvantages inherent in the known types of vehicle mounted vices now present in the prior art, the present invention provides a new VERTICALLY ADJUSTABLE VEHICLE MOUNTED VICE construction wherein the same can be utilized for allowing vertical movement of a vice coupled to a vehicle.

The general purpose of the present invention, which will be described subsequently in greater detail, is to provide a new VERTICALLY ADJUSTABLE VEHICLE MOUNTED VICE apparatus and method which has many of the advantages of the vehicle mounted vices mentioned heretofore and many novel features that result in a new VERTICALLY ADJUSTABLE VEHICLE MOUNTED VICE which is not anticipated, rendered obvious, suggested, or even implied by any of the prior art vehicle mounted vices, either alone or in any combination thereof.

To attain this, the present invention generally comprises a mounting bar assembly including a horizontal linear bar having a square cross-section. The horizontal linear bar has a first end coupled to a rear extent of the vehicle and a second end extending rearwardly therefrom. Formed on the second end of the linear bar is a sleeve defined by four side faces integrally coupled in a rectilinear configuration. As such, the sleeve has an open top and an open bottom. It should be noted that the coupling of the horizontal linear bar with the sleeve is made on one of the side faces thereof. Shown in both FIGS. 1 & 2 is a vice support assembly including a vertical linear bar having a square cross-section with a planar square base plate integrally coupled to a bottom end thereof. The vertical linear bar is slidably situated within the sleeve of the mounting assembly with a second end extending thereabove. A horizontally oriented aperture is formed in the vertical linear bar between a pair of opposed sides thereof. Next provided is a vice having a bottom face with a mounting plate coupled thereto. A cap is coupled to a lower surface of the mounting plate and extended downwardly therefrom. As shown in FIG. 3, the cap is defined by four side faces integrally coupled in a rectilinear configuration so as to form an open bottom. By this structure, the cap is adapted for releasably receiving the second end of the vertical linear bar of the vice support assembly. The cap further has a horizontally oriented aperture formed therein between a pair of opposed side faces thereof. Finally, a securement pin is included for allowing the coupling of the vice with the vice support assembly. The securement pin has a cylindrical configuration with a first end having a tab formed thereon. A second end of the securement pin is equipped with a bore. The securement pin is removably situated within the apertures of the vice support assembly and the vice such that a clip may positioned within the bore for precluding the removal of the vice from the vice support assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new VERTICALLY ADJUSTABLE VEHICLE MOUNTED VICE apparatus and method which has many of the advantages of the vehicle mounted vices mentioned heretofore and many novel features that result in a new VERTICALLY ADJUSTABLE VEHICLE MOUNTED VICE which is not anticipated, rendered obvious, suggested, or even implied by any of the prior art vehicle mounted vices, either alone or in any combination thereof.

It is another object of the present invention to provide a new VERTICALLY ADJUSTABLE VEHICLE MOUNTED VICE which may be easily and efficiently manufactured and marketed.

It is a further object of the present invention to provide a new VERTICALLY ADJUSTABLE VEHICLE MOUNTED VICE which is of a durable and reliable construction.

An even further object of the present invention is to provide a new VERTICALLY ADJUSTABLE VEHICLE MOUNTED VICE which is susceptible of a low cost of manufacture with regard to both materials and labor, and which accordingly is then susceptible of low prices of sale to the consuming public, thereby making such VERTICALLY ADJUSTABLE VEHICLE MOUNTED VICE economically available to the buying public.

Still yet another object of the present invention is to provide a new VERTICALLY ADJUSTABLE VEHICLE MOUNTED VICE which provides in the apparatuses and methods of the prior art some of the advantages thereof, while simultaneously overcoming some of the disadvantages normally associated therewith.

Still another object of the present invention is to provide a new VERTICALLY ADJUSTABLE VEHICLE MOUNTED VICE for allowing vertical movement of a vice coupled to a vehicle.

Even still another object of the present invention is to provide a new VERTICALLY ADJUSTABLE VEHICLE MOUNTED VICE that includes a vehicle with an adjustable vertical mounting mechanism coupled to a rear extent thereof. Further provided is a vice coupled to the adjustable vertical mounting mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
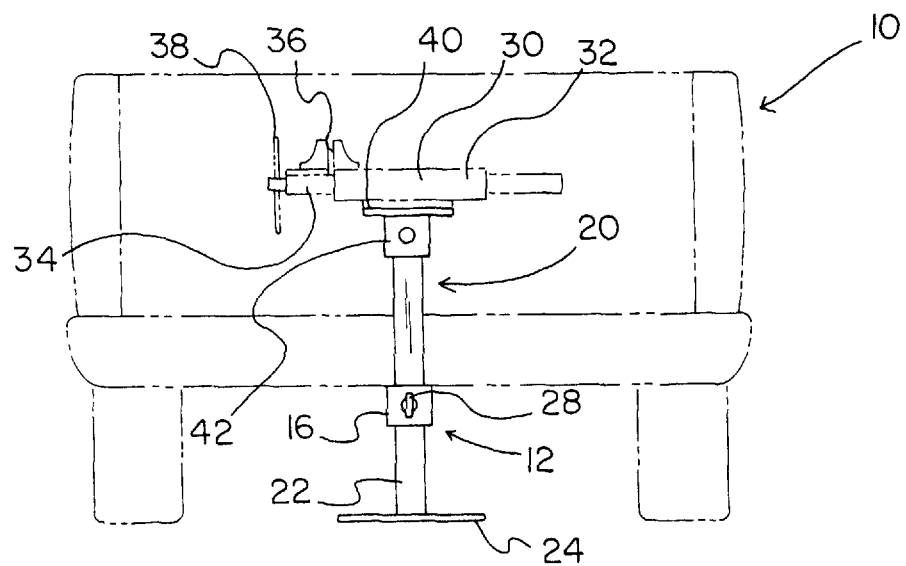
FIG. 1 is a rear view of a new VERTICALLY ADJUSTABLE VEHICLE MOUNTED VICE according to the present invention.

With reference now to the drawings, and in particular to FIGS. 1 through 4 thereof, a new VERTICALLY ADJUSTABLE VEHICLE MOUNTED VICE embodying the principles and concepts of the present invention and generally designated by the reference numeral 10 will be described.

Figure 2:
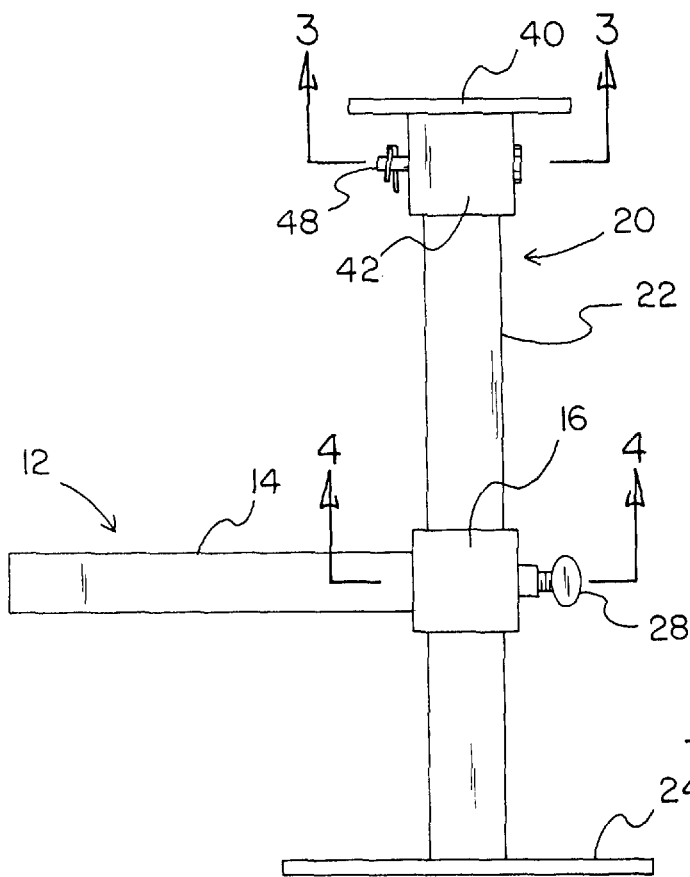
FIG. 2 is a side view of the present invention.

As shown in FIG. 2, the system 10 of the present invention includes a mounting bar assembly 12 including a horizontal linear bar 14 having a square cross-section. Preferably, the horizontal linear bar has a length of about 2–3 feet. The horizontal linear bar has a first end coupled to a rear extent of the vehicle and a second end extending rearwardly therefrom. In the preferred embodiment, the horizontal linear bar is coupled to a hitching mechanism located on an underside of the vehicle. Formed on the second end of the linear bar is a sleeve 16 defined by four side faces integrally coupled in a rectilinear configuration. As such, the sleeve has an open top and an open bottom. It should be noted that the coupling of the horizontal linear bar with the sleeve is made on one of the side faces thereof.

Shown in both FIGS. 1 & 2 is a vice support assembly 20 including a vertical linear bar 22 having a square cross-section. A planar square base plate 24 is integrally coupled to a bottom end of the vertical linear bar. Ideally, the vertical linear bar has a height of about 3–4 feet. The vertical linear bar is slidably situated within the sleeve of the mounting assembly with a second end extending thereabove. Such coupling allows only vertical movement. As such, the base plate engages the ground when in use. It should be noted that the vertical linear bar is of a greater length than the horizontal bar. Further, a horizontally oriented aperture 26 is formed in the vertical linear bar between a pair of opposed sides thereof. Strictly as an option, a thumb securement screw 28 may be screwably coupled within a threaded aperture formed in the sleeve for releasably engaging with the vertical linear bar. This allows for fixing the position of the vertical linear bar with respect to the mounting assembly.

Figure 3:
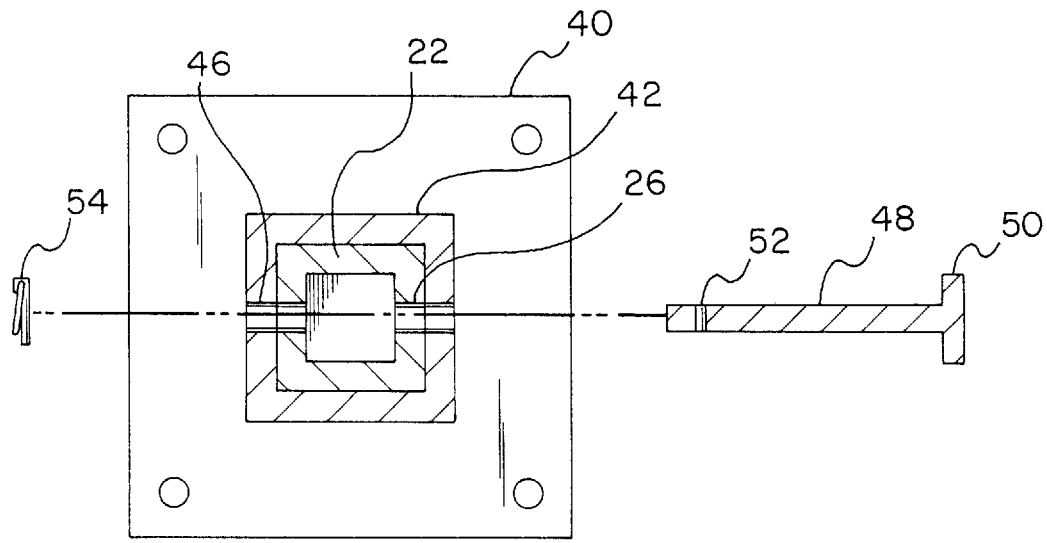
FIG. 3 is a cross-sectional view of the present invention taken along line 3—3 shown in FIG. 2.
Figure 4:
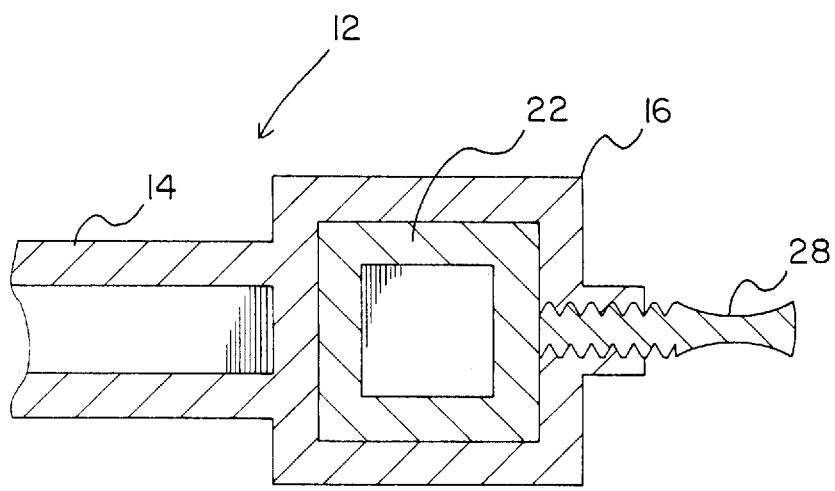
FIG. 4 is a cross-sectional view of the present invention taken along line 3—3 shown in FIG. 3.

Next provided is a vice 30. The vice is constructed in a conventional nature with a fixed portion 32 and a movable portion 34 both with a knurled engagement face 36. The engagement face of the movable portion is adapted to be moved in relation with that of the fixed portion by way of a rotating pin 38. As shown in FIG. 1, the vice further has a bottom face with a mounting plate 40 coupled thereto. A cap 42 is coupled to a lower surface of the mounting plate and extended downwardly therefrom. As shown in FIG. 3, the cap is defined by four side faces integrally coupled in a rectilinear configuration so as to form an open bottom. By this structure, the cap is adapted for releasably receiving the second end of the vertical linear bar of the vice support assembly. The cap further has a horizontally oriented aperture 46 formed therein between a pair of opposed side faces thereof.

Finally, a securement pin 48 is included for allowing the coupling of the vice with the vice support assembly. The securement pin has a cylindrical configuration with a first end having a tab 50 formed thereon. A second end of the securement pin is equipped with a bore 52. The securement pin is removably situated within the apertures of the vice support assembly and the vice such that a clip 54 may positioned within the bore for precluding the removal of the vice from the vice support assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vice mounted on a vehicle comprising, in combination:

a vehicle;

a mounting bar assembly including a horizontal linear bar having a square cross-section with a first end coupled to a rear extent of the vehicle and a second end extending rearwardly therefrom and a sleeve defined by four side faces integrally coupled in a rectilinear configuration so as to define an open top and an open bottom with one of the side faces thereof integrally coupled to the second end of the horizontal linear bar;

a vice support assembly including a vertical linear bar having a square cross-section with a planar square base plate integrally coupled to a bottom end thereof, the vertical linear bar being slidably situated within the sleeve of the mounting assembly with a second end extending thereabove with a horizontally oriented aperture formed therein between a pair of opposed sides thereof;

a vice having a bottom face with a mounting plate coupled thereto and a cap coupled to a lower surface of the mounting plate and extending downwardly therefrom, the cap defined by four side faces integrally coupled in a rectilinear configuration so as to form an open bottom for releasably receiving the second end of the vertical linear bar of the vice support assembly, the cap further having a horizontally oriented aperture formed therein between a pair of opposed side faces thereof; and a securement pin with a cylindrical configuration having a first end with a tab formed thereon and a second end with a bore formed therein, the securement pin removably situated within the apertures of the vice support assembly and the vice such that a clip may be positioned within the bore for precluding the removal of the vice from the vice support assembly.

2. A vehicular vice mounting assembly for attachment to a vehicle, the mounting assembly comprising:

a generally horizontal bar for mounting on a rear extent of a vehicle, the horizontal bar having a sleeve mounted thereon;

a generally vertical bar including a top end adapted for supporting a vice thereon and a bottom end with a foot mounted thereon, the vertical bar being slidably mounted in the sleeve of the horizontal bar along a vertical axis between a raised orientation with the foot spaced above a ground surface and a lowered orientation with the foot rested on a ground surface, wherein the vertical bar is lockable at a user selected height; and a vice mounted on the top end of the generally vertical bar;

wherein the vertical bar is lockable by way of a set screw threadedly engaged with a threaded bore formed in the sleeve;

wherein the vice is lockably mounted on the vertical bar via a pin which extends through the vertical bar and a cap depending from the vice; and wherein the foot includes a horizontally oriented plate.

* * * * *